United States Patent
Sagae et al.

(10) Patent No.: US 12,189,178 B2
(45) Date of Patent: Jan. 7, 2025

(54) OPTICAL FIBER

(71) Applicant: NIPPON TELEGRAPH AND TELEPHONE CORPORATION, Tokyo (JP)

(72) Inventors: Yuto Sagae, Musashino (JP); Takashi Matsui, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/928,498

(22) PCT Filed: Jun. 3, 2020

(86) PCT No.: PCT/JP2020/021889
§ 371 (c)(1),
(2) Date: Nov. 29, 2022

(87) PCT Pub. No.: WO2021/245827
PCT Pub. Date: Dec. 9, 2021

(65) Prior Publication Data
US 2023/0244028 A1    Aug. 3, 2023

(51) Int. Cl.
*G02B 6/02*    (2006.01)
*G02B 6/028*   (2006.01)
*G02B 6/036*   (2006.01)

(52) U.S. Cl.
CPC ..... *G02B 6/03622* (2013.01); *G02B 6/02009* (2013.01); *G02B 6/02219* (2013.01);
(Continued)

(58) Field of Classification Search
CPC ........... G02B 6/02009; G02B 6/02219; G02B 6/02266; G02B 6/02366; G02B 6/0281;
(Continued)

(56) References Cited

U.S. PATENT DOCUMENTS

| 4,372,647 A * | 2/1983 | Okamoto | G02B 6/03611 |
| | | | 385/127 |
| 6,636,684 B1 * | 10/2003 | Paek | G02B 6/03611 |
| | | | 385/142 |

FOREIGN PATENT DOCUMENTS

| JP | S51-117643 A | 10/1976 |
| JP | 2003-131060 A | 5/2003 |
| JP | 2019151493 A | 9/2019 |

OTHER PUBLICATIONS

G. Laughlin, A. Aguirre and J. Grundfest, "Information Transmission Between Financial Markets in Chicago and New York", arXiv: 1302. 5966v1, Feb. 26, 2013.
(Continued)

*Primary Examiner* — Ryan A Lepisto (57) ABSTRACT

The optical fiber according to the present invention includes, in a cross section of the optical fiber, one core region (11) and a cladding region (12) that is arranged on an outer periphery of the core region. The cladding region is a medium that has a lower refractive index than that of the core region and also has a smaller refractive index wavelength dispersion than that of the core region. The optical fiber has a solid core and therefore, allows more reduction in the Rayleigh scattering loss compared to an optical fiber having a hollow core. In addition, since the optical fiber adopts, for the cladding region, a medium that has a smaller refractive index wavelength dispersion than that of the core region, it allows a reduction in the wavelength dispersion of $n_{eff}$.

2 Claims, 7 Drawing Sheets

(52) U.S. Cl.
CPC ..... *G02B 6/02266* (2013.01); *G02B 6/02366* (2013.01); *G02B 6/0281* (2013.01); *G02B 6/036* (2013.01); *G02B 6/03627* (2013.01)

(58) Field of Classification Search
CPC . G02B 6/036; G02B 6/03622; G02B 6/03627
See application file for complete search history.

(56) References Cited

OTHER PUBLICATIONS

J. Jay, "Low Signal Latency in Optical Fiber Networks", Corning Technical Paper, WP8080, 2011.

N.V. Wheeler, M. V. Petrovich, R. Slavik, N. Baddela, E. Numkam, J. R. Hayes, D.R. Gray, F. Poletti and D. J. Richardson, "Wide-bandwidth, low-loss, 19-cell hollow core photonic band gap fiber and its potential for low latency data transmission," In Proceedings of OFC/NFOEC, PDP5A. 2, Mar. 2012.

Y. Sagae, T. Matsui, K. Tsujikawa and K. Nakajima, "Solid-Type Low-Latency Optical Fiber With Large Effective Area", J. Lightwave Technol. vol. 37, Issue 19, 2019.

<https://www.ohara-inc.co.jp/wp-content/uploads/2019/12/jsfpl53.pdf (Ohara Inc.), searched on May 18, 2020, with partial English translation thereof.>.

T. Kato, M. Hirano, M. Onishi and M. Nishimura, "Ultra-low nonlinearity low-loss pure silica core fibre for long-haul WDM transmission," Electron. Lett. vol. 35, No. 19, 1999.

\* cited by examiner

| | OPTICAL FIBER OF THE EMBODIMENT | OPTICAL FIBER OF COMPARATIVE EXAMPLE |
|---|---|---|
| $\tau$ (μs/km) | 4.84 | 4.85 |
| $\tau_n$ (μs/km) | 4.78 | 4.78 |
| $\tau_d$ (μs/km) | 0.06 | 0.07 |

Fig. 7

OPTICAL FIBER

CROSS-REFERENCE TO RELATED APPLICATIONS

This application is a 371 U.S. National Phase of International Application No. PCT/JP2020/021889, filed on Jun. 3, 2020. The entire disclosure of the above application is incorporated herein by reference.

TECHNICAL FIELD

The present disclosure relates to a single mode optical fiber.

BACKGROUND ART

With the recent diversification of network usage patterns, a demand for reduction in communication delay has been increasing in addition to a demand for an increase in communication capacity. The cause of the occurrence of a communication delay is roughly divided into a signal congestion delay in a transmission device and a light propagation delay that occurs in a transmission path; and as a communication distance becomes longer, the light propagation delay becomes more apparent. Conventionally, reduction in a propagation delay has been addressed by reducing the length of a transmission path or using microwaves as a transmission path (e.g., see Non-Patent Literature 1).

Reduction in a propagation delay can also be achieved by reducing the group delay time of an optical fiber. Here, the group delay time $\tau$ is determined by the following expression with the effective refractive index $n_{eff}$ of the optical fiber and the wavelength dispersion thereof:

[Math. 1]

$$\tau = \frac{1}{c}\left(n_{eff} + k\frac{dn_{eff}}{dk}\right) = \tau_n + \tau_d \quad (1)$$

where c is the speed of light in vacuum and k is an optical wavenumber. Here, the first term, which is determined by $n_{eff}$, is represented as a group delay time $\tau_n$ and the second term, which is determined by dispersion of the effective refractive index $n_{eff}$, is represented as a group delay time $\tau_d$.

As for general-purpose optical fibers, the optical fiber using a pure silica core has the smallest group delay time (e.g., see Non-Patent Literature 2). This is because the $n_{eff}$ thereof is smaller compared to other optical fibers. On the other hand, as for optical fibers having a hollow core, light is propagated in the air and therefore, $n_{eff}$ is almost 1 and a group delay time is significantly reduced. However, it is difficult to manufacture a minute structure for confining light within a hollow region and this makes it difficult to reduce a propagation loss (e.g., see Non-Patent Literature 3). As for optical fibers using a solid core, the optical fiber having a shrunk pure silica core and a double cladding structure allows a reduction of $n_{eff}$ and achieves a reduction of the group delay time by 0.3% compared to a general-purpose pure silica core fiber, with a loss equivalent to that of a general-purpose single-mode optical fiber. For reduction of the delay in a solid-core, it is preferable to use a fluorine-doped silica glass core having a lower refractive index than that of a pure silica glass core so as to reduce $n_{eff}$ (e.g., see Non-Patent Literature 4).

It should be noted that the "single-mode optical fiber," herein, means that light propagates in a single mode with a wavelength (e.g., 1.50 µm to 1.60 µm) that is longer than the cutoff wavelength of the optical fiber.

CITATION LIST

Non-Patent Literature

Non-Patent Literature 1: G. Laughlin, A. Aguirre and J. Grundfest, "Information Transmission Between Financial Markets in Chicago and New York," arXiv: 1302.5966v1, February, 2013.

Non-Patent Literature 2: J. Jay, "Low Signal Latency in Optical Fiber Networks," Corning Technical Paper, WP8080, 2011.

Non-Patent Literature 3: N. V. Wheeler, M. V. Petrovich, R. Slavik, N. Baddela, E. Numkam, J. R. Hayes, D. R. Gray, F. Poletti and D. J. Richardson, "Wide-bandwidth, low-loss, 19-cell hollow core photonic band gap fiber and its potential for low latency data transmission," In Proceedings of OFC/NFOEC, PDP5A. 2, Mar. 2012.

Non-Patent Literature 4: Y. Sagae, T. Matsui, K. Tsujikawa and K. Nakajima, "Solid-Type Low-Latency Optical Fiber With Large Effective Area," J. Lightwave Technol. Vol. 37, Issue 19, 2019.

Non-Patent Literature 5: https://www.ohara-inc.co.jp/wp-content/uploads/2019/12/jsfp153.pdf (OHARA INC.), searched on May 18, 2020.

Non-Patent Literature 6: T. Kato, M. Hirano, M. Onishi and M. Nishimura. "Ultra-low nonlinearity low-loss pure silica core fibre for long-haul WDM transmission," Electron. Lett. Vol. 35, No. 19, 1999.

SUMMARY OF THE INVENTION

Technical Problem

However, doping fluorine into the core region causes a reduction of the effective refractive index $n_{eff}$, causing an increase in the Rayleigh scattering loss. Thus, the optical fiber using a fluorine-doped glass core has a problem in which the group delay time and the Rayleigh scattering loss have a tradeoff relation and it is difficult to reduce both of them.

Therefore, in order to solve the above problem, the present invention aims to provide an optical fiber that can reduce both the group delay time and the Rayleigh scattering loss.

Means for Solving the Problem

In order to achieve the above aim, an optical fiber according to the present invention includes a solid core and has a refractive index wavelength dispersion of a cladding region smaller than that of a core region to reduce the wavelength dispersion of $n_{eff}$. Thus, a tradeoff between a reduction of the group delay time and an increase in a loss is moderated.

More specifically, the optical fiber according to the present invention includes, in a cross section of the optical fiber, one core region and a cladding region that is arranged on an outer periphery of the core region, in which the cladding region is a medium that has a lower refractive index than that of the core region and also has a smaller refractive index wavelength dispersion than that of the core region.

The optical fiber has a solid core and therefore, allows more reduction in the Rayleigh scattering loss compared to an optical fiber having a hollow core. In addition, since the optical fiber adopts, for the cladding region, a medium having a smaller refractive index wavelength dispersion than that of the core region, it allows a reduction in the wavelength dispersion of $n_{eff}$. Thus, the present invention can provide an optical fiber that can reduce both a group delay time and a Rayleigh scattering loss.

For example, the medium of the cladding region of the optical fiber according to the present invention has a larger Abbe number than that of the medium of the core region.

In addition, the optical fiber according to the present invention further includes, in the cross section of the optical fiber, a physical cladding region that is arranged on an outer periphery of the cladding region, in which the physical cladding region has a higher refractive index than that of the cladding region and the medium of each of the core region and the physical cladding region is silica glass.

By adopting this structure, a technique for manufacturing general-purpose optical fibers can be applied and by adopting a W structure, optical characteristics equivalent to those of general-purpose optical fibers can be obtained.

It should be noted that the above aspects of the invention can be combined wherever possible.

Effects of the Invention

The present invention can provide an optical fiber that can reduce both a group delay time and a Rayleigh scattering loss.

BRIEF DESCRIPTION OF DRAWINGS

FIG. 4(A) is a diagram that describes a refractive index dispersion in a cross section. FIG. 4(B) is a diagram that describes a cross-section structure.

FIG. 7(A) is a diagram that describes a refractive index dispersion in a cross section. FIG. 7(B) is a diagram that describes a cross-section structure.

DESCRIPTION OF EMBODIMENTS

Embodiments of the present invention will be described with reference to attached drawings. The embodiments described below are examples of the present invention and the present invention is not limited to the embodiments described below. It should be noted that in this description and the drawings, the components denoted by the same reference numeral are the same as each other.

Overview of the Invention

Figure 1:
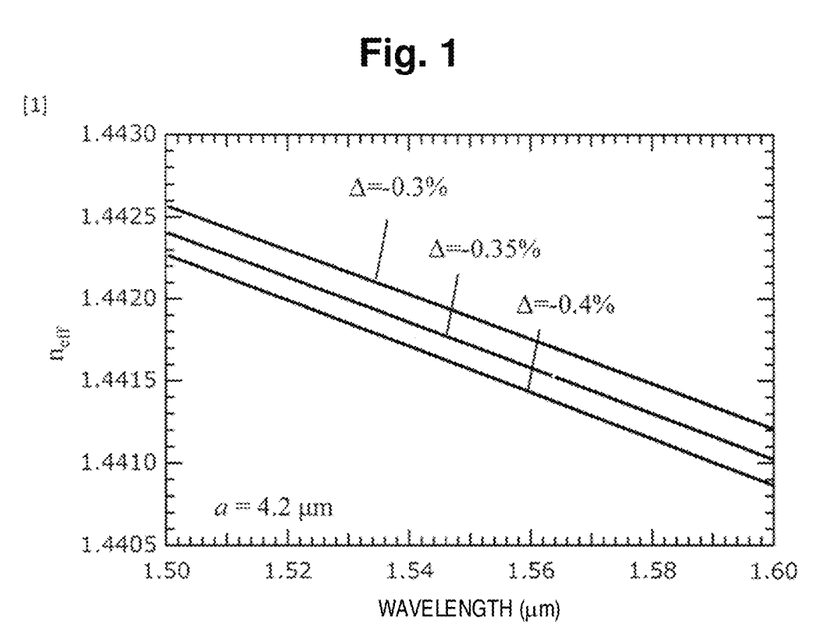
FIG. 1 is a characteristics diagram that describes the wavelength dispersion of an effective refractive index $n_{eff}$ in an SI-type pure silica core fiber.

FIG. 1 is a diagram that describes a relationship between a wavelength (lateral axis) and an effective refractive index (vertical axis) in a step-index (SI) type pure silica core optical fiber. The pure silica core optical fiber has a core radius of a=4.2 μm that is equal to that of a general-purpose single mode optical fiber. Three straight lines illustrated in FIG. 1 show the wavelength dispersion of the effective refractive indices $n_{eff}$ when a relative refractive index difference Δ of the cladding to the core of the pure silica core optical fiber is −0.3%, −0.35%, and −0.4%. As illustrated in FIG. 1, $n_{eff}$ always decreases on a longer wavelength side in any structure, due to the refractive index wavelength dispersion of pure silica glass. In addition, with a decrease of Δ, that is, a decrease in the refractive index of the cladding, the effective refractive indices $n_{eff}$ uniformly decrease.

Figure 2:
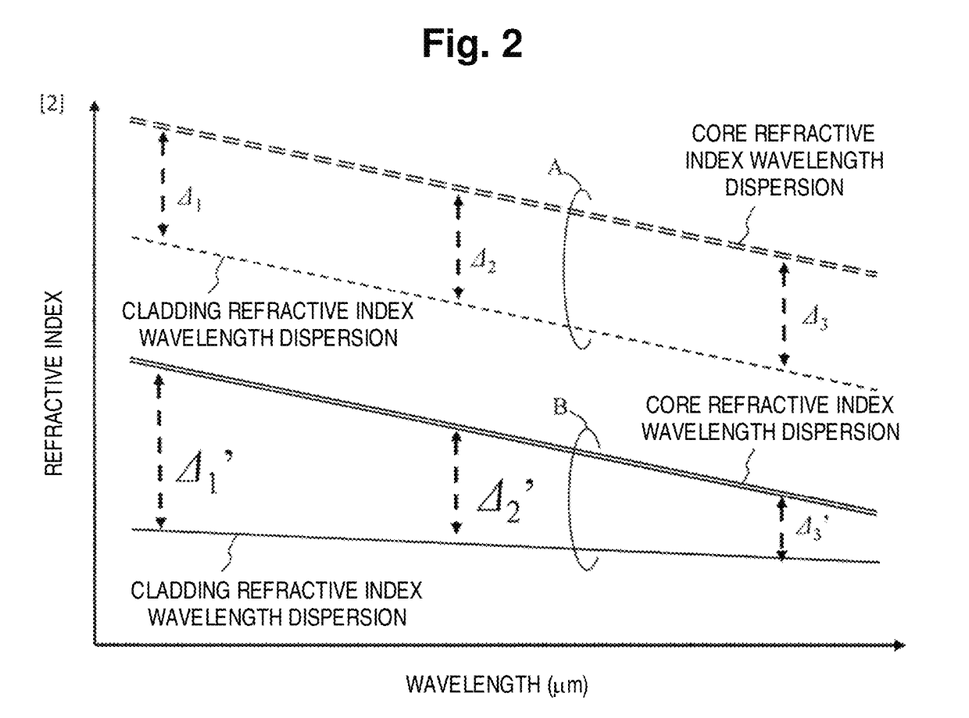
FIG. 2 is a characteristics diagram in which the effective refractive indices of an optical fiber according to the present invention and a conventional optical fiber are compared.

Here, by employing a waveguide structure in which the relative refractive index difference Δ increases with an increase in an operating wavelength, the wavelength dispersion of $n_{eff}$ decreases, allowing a reduction in a group delay time. FIG. 2 is a diagram that describes that the group delay time can be reduced by making the refractive index wavelength dispersion of the cladding smaller than the refractive index wavelength dispersion of the core. Data A and data B are examples of the refractive index wavelength dispersion of a core and a cladding in a conventional optical fiber and the optical fiber according to the present invention, respectively. The dashed double line of the data A shows the refractive index wavelength dispersion of the core of the conventional optical fiber, the dashed line of the data A shows the refractive index wavelength dispersion of the cladding of the conventional optical fiber, the double solid line of the data B shows the refractive index wavelength dispersion of the core of the optical fiber of the present invention, and the solid line of the data B shows the refractive index wavelength dispersion of the cladding of the optical fiber of the present invention.

Since the conventional optical fiber uses glass having the same wavelength dispersion for the core and cladding, each relative refractive index difference is $\Delta_1=\Delta_2=\Delta_3$ even at different operating wavelengths. On the other hand, the optical fiber according to the present invention uses, for the cladding, glass having a smaller refractive index wavelength dispersion than in the core and thereby obtains $\Delta_1'>\Delta_2'>\Delta_3'$ with an increase in the operating wavelength. By selecting, for the cladding, a medium with which the relative refractive index becomes smaller on the longer wavelength side as in the data B, the slope of the straight line shown in FIG. 1 can be moderated. That is, this means that the wavelength dispersion of $n_{eff}$ is reduced.

Thus, the present invention can provide an optical fiber that can reduce both the group delay time and the Rayleigh scattering loss by adopting, for a cladding region of the optical fiber, a medium having a smaller refractive index wavelength dispersion than that of a core region.

First Embodiment

In an optical fiber of this embodiment, the medium of a cladding region has a larger Abbe number than that of the medium of a core region.

In general, the refractive index wavelength dispersion of an optical medium is represented by the Abbe number $v_d$. The Abbe number is defined by $v_d=(n_d-1)/(n_F-n_C)$ using a refractive index $n_d$ at the wavelength of 587.56 nm, a refractive index $n_F$ at the wavelength of 486.1 nm, and a refractive index $n_C$ at the wavelength of 656.3 nm; and in general, the larger $v_d$ is, the smaller the refractive index wavelength dispersion is.

Figure 3:
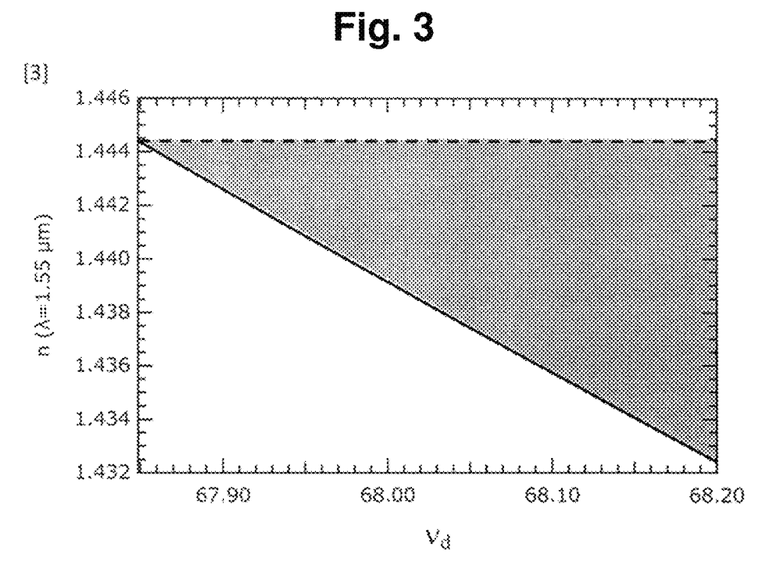
FIG. 3 is a characteristics diagram that illustrates a relationship between the refractive index n and the Abbe number $v_d$ of a medium that can be used for a cladding region of the optical fiber according to the present invention.

Therefore, it is only required to use, for the cladding region, a material that has a larger Abbe number and a smaller refractive index compared to the core region. In FIG. 3, a relationship between the refractive index n and the Abbe number $v_d$ at the wavelength of 1.55 μm of a fluorine-doped silica glass is indicated by a solid line. Note that as for pure silica glass, n=1.444. As the refractive index decreases due to doping of fluorine, $v_d$ increases. A relationship between n and $v_d$ of the fluorine-doped glass is represented by the following expression:

[Math. 2]

$$n=-0.0343v_d+3.771 \qquad (2)$$

More specifically, an optical medium with which the relationship between n and $v_d$ falls in the gray region of FIG. 3 (region where the Abbe number is larger and the refractive index is smaller compared to a core material of pure silica glass), that is, an optical medium in which

[Math. 3]

$$1.444>n>-0.0343v_d+3.771 \qquad (3)$$

is obtained is used for the cladding; and thereby the group delay time $\tau_d$ (the second term of the expression (1)) can be reduced. Thus, the optical fiber of this embodiment can moderate a tradeoff relationship between a decrease in the group delay time and an increase in loss.

Figure 4:
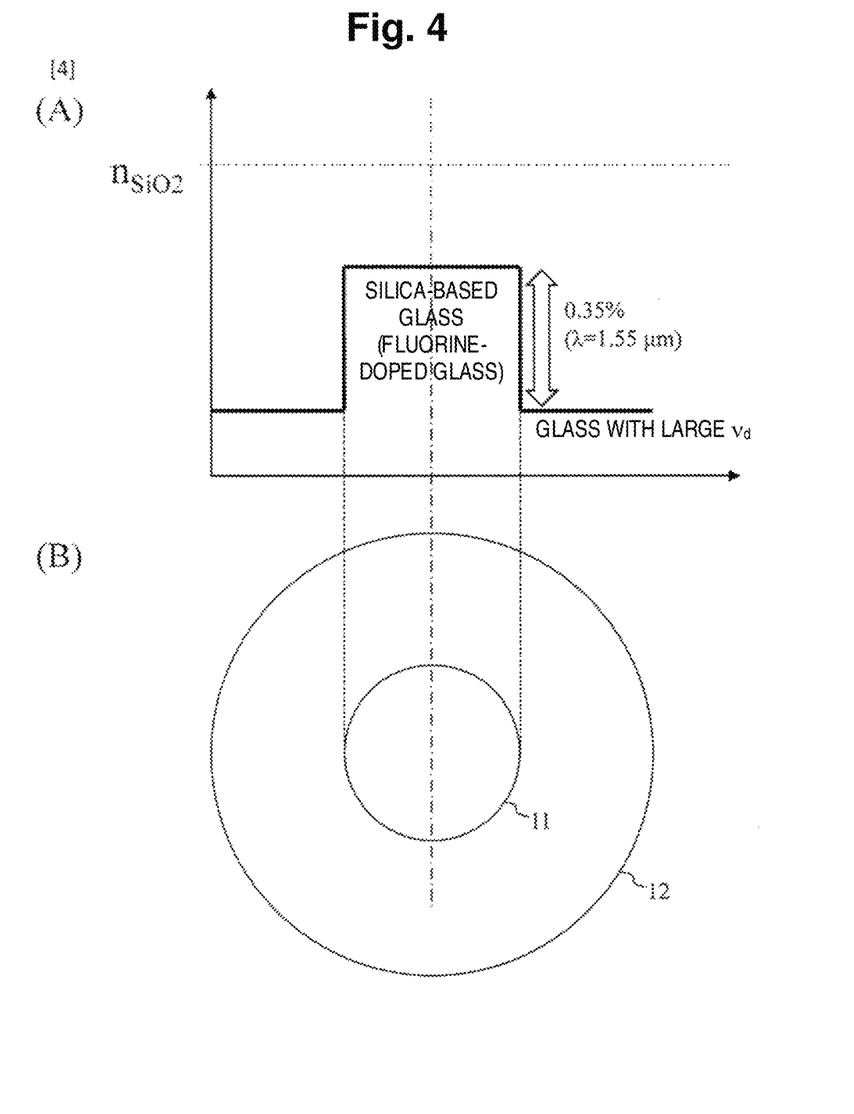
FIG. 4 is a diagram that describes the optical fiber according to the present invention.

FIG. 4 is a diagram that describes an example of the optical fiber of this embodiment. FIG. 4(A) is a diagram that describes a refractive index profile in a cross section of the optical fiber. FIG. 4(B) is a diagram that describes a cross-section structure of the optical fiber. In the optical fiber, silica glass is used for a core region 11 and S-FPL53 (Abbe number $v_d$=94.93, Non-Patent Literature 5) that satisfies the relationship in the expression (3) is used for a cladding region 12. At this point, fluorine is doped into the core region 11 so that the relative refractive index difference Δ between the core region 11 and the cladding region 12 at the wavelength of 1.55 μm is −0.35%. This allows a reduction of the refractive index of the cladding region 12 by 0.67% compared to pure silica glass, achieving a single mode operation.

Figure 5:
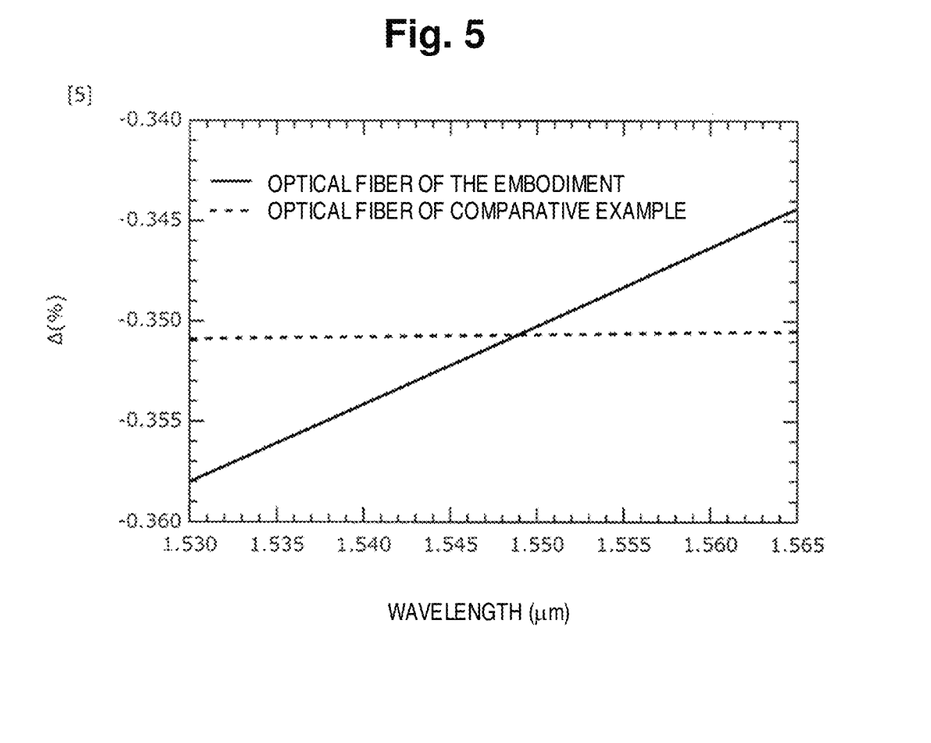
FIG. 5 is a characteristics diagram that describes a wavelength dependence of a relative refractive index difference of the optical fiber according to the present invention.

FIG. 5 shows the wavelength dependence (solid line) of the relative refractive index difference Δ in the optical fiber described with reference to FIG. 4. Here, the radius of the core is 4.2 μm as with a general-purpose SMF. In addition, for comparison, the wavelength dependence (dashed line) of the relative refractive index difference Δ in the SI-type fluorine core optical fiber (comparison example) is also shown. The SI-type fluorine core optical fiber has a core and cladding formed of fluorine-doped glass, in which the core radius is 4.2 μm, a core refractive index is lower by 0.67% compared to that of pure silica glass, and the relative refractive index difference Δ is −0.35%. In this SI-type fluorine core fiber, the relative refractive index difference Δ is independent of the operating wavelength; however, in the optical fiber of this embodiment, the relative refractive index difference Δ increases with an increase of the operating wavelength.

Figure 6:
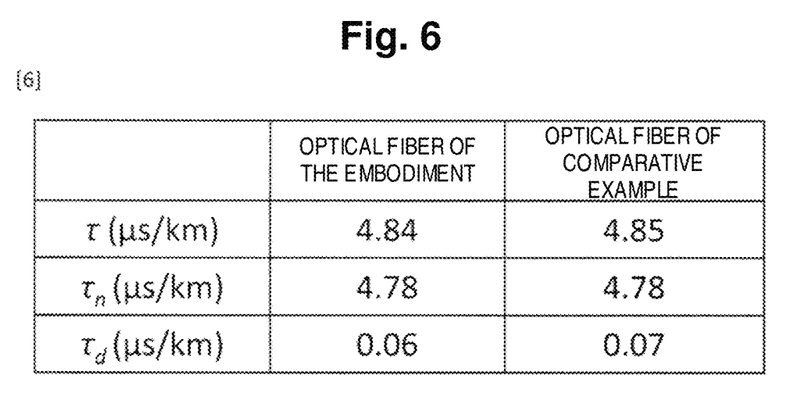
FIG. 6 is a characteristics table in which the group delay times of the optical fiber according to the present invention and a fluorine-doped core optical fiber are compared.

FIG. 6 is a diagram that describes results of calculating a group delay time in each of the optical fiber of this embodiment and the SI-type fluorine core optical fiber that is a comparative example in FIG. 5. The group delay times indicate $\tau$, $\tau_n$, and $\tau_d$ that are described for the expression (1). The group delay times $\tau$ of the optical fiber of this embodiment and the SI-type fluorine core optical fiber are 4.84 μs/km and 4.85 μs/km, respectively. The optical fiber of this embodiment achieves a lower delay by 0.17% compared to the SI-type fluorine core optical fiber. The $\tau_n$ that is the first term of the expression (1) is 4.78 μs/km for both. This is because both have the same core refractive index. On the other hand, $\tau_d$ that is the second term of the expression (1) is 0.06 μs/km for the optical fiber of this embodiment and is 0.07 μs/km for the SI-type fluorine core optical fiber; it is reduced in the optical fiber of this embodiment. This is because the wavelength dispersion of $n_{eff}$ is reduced.

As described above, the optical fiber of the present invention can be expected not only to reduce delay due to a reduction of $n_{eff}$ of a fluorine-doped core but also to further reduce the delay due to a reduction in the wavelength dispersion of $n_{eff}$. In addition, as for an optical loss of an optical fiber in which light is sufficiently confined, a loss in a core is dominant. Therefore, as in the present invention, by using glass having a large Abbe number $v_d$ in the cladding region, a tradeoff between a reduction of delay and an increase in the Rayleigh scattering loss can be moderated.

Second Embodiment

Figure 7:
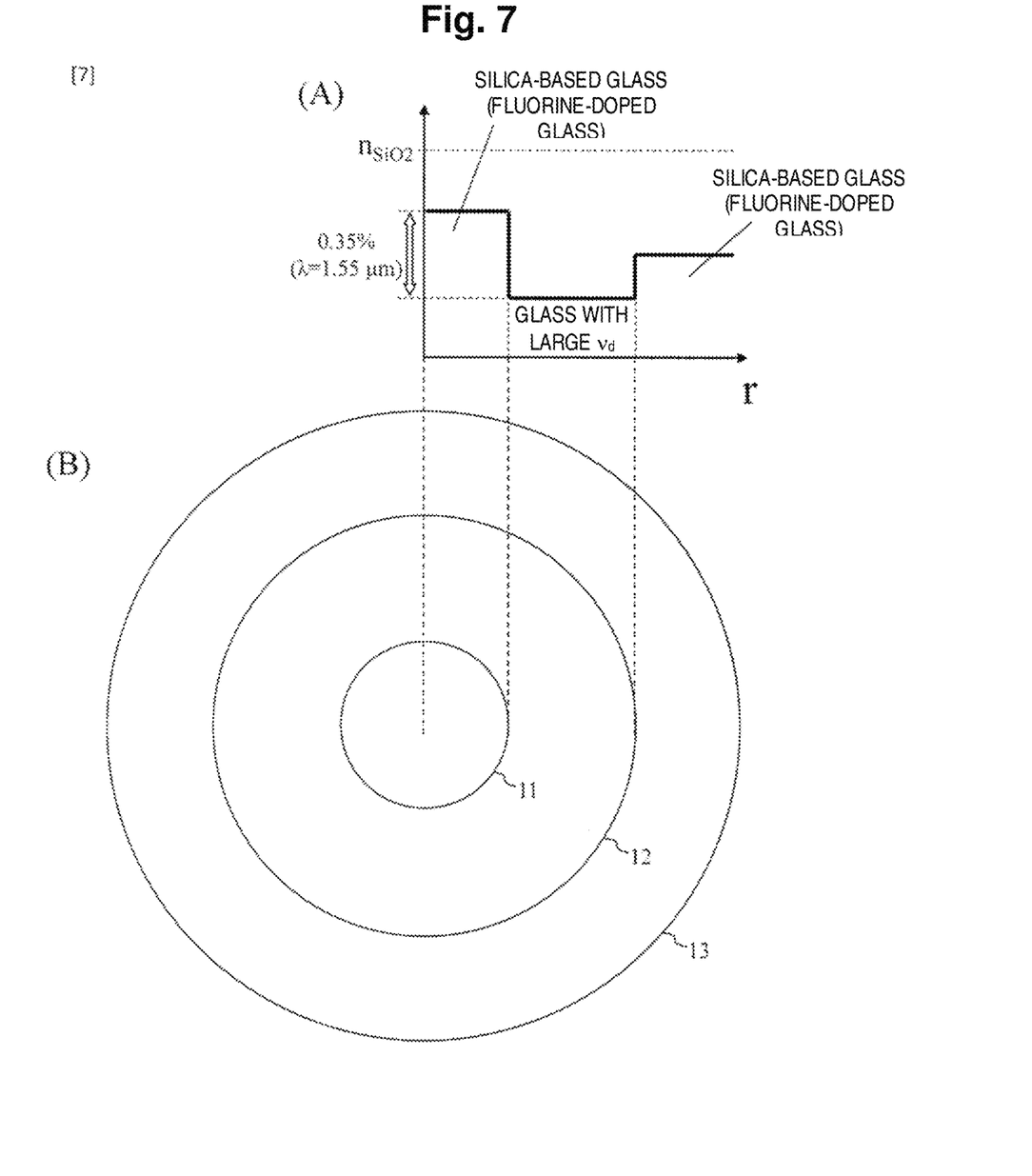
FIG. 7 is a diagram that describes an optical fiber according to the present invention.

An optical fiber of this embodiment has a W-type refractive index distribution. More specifically, the optical fiber further includes a physical cladding region 13 that is arranged on an outer periphery of the cladding region 12, as compared to the optical fiber described in the first embodiment, in which the physical cladding region 13 has a higher refractive index than that of the cladding region 12, and the medium of each of the core region 11 and the physical cladding region 13 is silica glass.

FIG. 7 is a diagram that describes a refractive index distribution structure of the optical fiber. The optical fiber uses silica-based glass such as fluorine-doped glass for the core region 11 as with the optical fiber of the first embodiment; has a low refractive index layer (cladding region 12) of glass with a large Abbe number $v_d$ coaxially arranged on an outside thereof; and has silica-based glass (physical cladding region 13) such as fluorine-doped glass arranged on an outside of the low refractive index layer.

The optical fiber is preferable in that, since heating conditions in spinning are determined by a silica-based glass cladding in the outermost layer having a large area, the manufacturing technique for a general-purpose optical fiber can be applied. In addition, by adopting the existing W-type structure described in Non-Patent Literature 6, optical characteristics equivalent to that of a general-purpose optical fiber can be obtained.

INDUSTRIAL APPLICABILITY

The present invention is applicable to an inter-terminal communication in an optical communication system.

REFERENCE SIGNS LIST

11 Core region
12 Cladding region
13 Physical cladding region

The invention claimed is:

1. An optical fiber, comprising,
in a cross section of the optical fiber, one core region and a cladding region that is arranged on an outer periphery of the core region,
wherein the cladding region is a medium having a lower refractive index n than that of the core region and having a smaller refractive index wavelength dispersion than that of the core region,
in which the refractive index n satisfies, at a wavelength of 1.55 μm, $$1.444 > n > -0.0343 v_d + 3.771,$$

provided that $v_d$ is an Abbe number.

2. The optical fiber according to claim 1, further comprising, in the cross section of the optical fiber, a physical cladding region that is arranged on an outer periphery of the cladding region and comprises a fluorine-doped glass,
wherein the physical cladding region has a higher refractive index than that of the cladding region, and
a medium of each of the core region and the physical cladding region is silica glass.

* * * * *